United States Patent Office 3,453,315
Patented July 1, 1969

3,453,315
9-ISOPROPYLIDENYL-9,10-DIHYDRO-ANTHRA-CENE-10-CARBOXYLIC ACID ESTERS
Jean Rigaudy, Bourg La Reine, France, assignor to Roussel-Uclaf, Paris, France, a corporation of France
No Drawing. Filed June 21, 1966, Ser. No. 559,107
Claims priority, application France, June 23, 1965, 21,950
Int. Cl. C07c *101/42, 67/00*
U.S. Cl. 260—469                     6 Claims

ABSTRACT OF THE DISCLOSURE

The present invention relates to novel derivatives of 9,10-dihydro-anthracene and more particularly to the 9-isopropylidenyl - 9,19 - dihydro-anthracene-10-carboxylic acid esters with β-di-lower-alkylamino-ethanols of the general formula I:

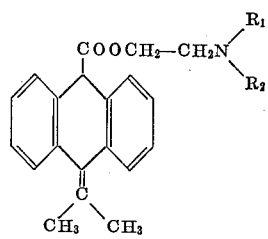

I wherein $R_1$ and $R_2$ represents a lower alkyl radical, and their pharmaceutically acceptable organic or inorganic acid salts. Furthermore, the invention relates to the process for the preparation of these compounds.

The novel derivatives of 9,10-dihydro-anthracene of the general Formula I and their organic or inorganic acid salts are endowed with interesting pharmacological properties. In particular, they possess a significant spasmolytical action, which is more intensive than that of known general active spasmolytics. Thus, they are 15 to 20 times more active than papaverine and substantially more active than spasomolytics of the family of anthracenic compounds such as the 9,10-dihydro-anthracene-10-carboxylic acid ester with β-diethylamino-ethanol or the 9,10-dihydro-anthracene-10-carboxylic acid ester with β-diethylamino-propanol (described in J.A.C.S. 1943, pages 1582–1585). These novel compounds of the invention can be utilized for the treatment of bronchial spasms, or arterial or visceral spasms and for the treatment of circulatory disorders in general.

OBJECTS OF THE INVENTION

An object of the present invention is the obtention of a 9-isopropylidenyl-9-10-dihydro-anthracene-10-carboxylic acid ester selected from the group consisting of a compound of the formula

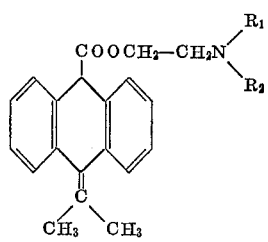

wherein $R_1$ and $R_2$ represent a lower alkyl, and its pharmaceutically acceptable organic and inorganic acid addition salts.

Another object of the present invention is the development of a process for the preparation of a 9-isopropylidenyl-9-10-dihydro-anthracene-10-carboxylic acid ester selected from the group consisting of a compound of the formula

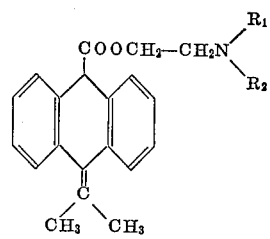

wherein $R_1$ and $R_2$ represent a lower alkyl, and its pharmaceutically acceptable organic and inorganic acid addition salts, which comprises the steps of reacting 9-(2'-hydroxy-isopropyl) - 9,10-dihydro - anthracene-10-carboxylic acid with a strong chlorinating agent, the resulting 9-isopropylidenyl-9,10-dihydro-anthracene-10-carboxylic acid chloride is reacted with a β-di-lower-alkylamino-ethanol in an organic solvent, and recovering said 9-isopropylidenyl-9, 10-dihydro-anthracene-10-carboxylic acid ester.

A yet further object of the present invention is the obtention of the intermediate, 9-isopropylidenyl-9,10-dihydro-anthracene-10-carboxylic acid chloride.

A still further object of the invention is the development of a method of attenuating spasms in warm-blooded animals which comprises administering a daily dose of from about 70 γ to 300 γ per kilogram of body weight of said warm-blooded animals of a 9-isopropylidenyl-9,10-dihydro-anthracene-10-carboxylic acid ester selected from the group consisting of a compound of the formula

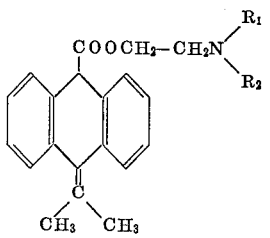

wherein $R_1$ and $R_2$ represent a lower alkyl, and its pharmaceutically acceptable organic and inorganic acid addition salts.

Another object of the invention is the obtention of therapeutic compositions comprising a minor part of a 9 - isopropylidenyl-9,10-dihydro-anthracene-10-carboxylic acid ester selected from the group consisting of a compound of the formula

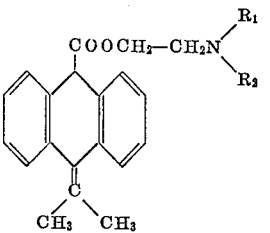

wherein $R_1$ and $R_2$ represent a lower alkyl, and its pharmaceutically acceptable organic and inorganic acid addition salts, and a major part of a pharmaceutically acceptable medium.

These and other objects of the invention will become more apparent as the description thereof proceeds.

DESCRIPTION OF THE INVENTION

It has now been discovered that 9-isopropylidenyl-9,10-dihydro-anthracene-10-carboxylic acid esters selected from the group consisting of a compound of the formula

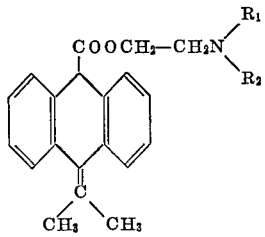

wherein $R_1$ and $R_2$ represent a lower alkyl, and its pharmaceutically acceptable organic and inorganic acid addition salts, are novel compounds which are endowed with spasmolytic properties.

The process for the preparation of these new compounds is characterized essentially in that 9-(2'-hydroxy-isopropyl)-9,10-dihydro-anthracene-10-carboxylic acid, is subjected to the action of a strong chlorination agent. The resultant 9-isopropylidenyl-9,10-dihydroanthracene-10-carboxylic acid chlorine is condensed with a β-di-lower-alkylamino-ethanol, thus obtaining the corresponding 9-isopropylidenyl-9,10-dihydro-anthracene-10-carboxylic acid ester with β-di-lower-alkylamino-ethanol, which compound is salified, if desired, by means of a pharmaceutically acceptable inorganic or organic acid.

The strong chlorination agent, to the action of which the 9-(2'-hydroxyisopropyl)-9,10-dihydro-anthracene-10-carboxylic acid is subjected, is selected from the group consisting of thionyl chloride, phosphorus trichloride and phosphorus pentachloride. The reaction occurs at room temperatures in the presence of an excess of the chlorinating agent.

β-di-lower-alkylamino-ethanol, which is condensed with 9-isopropylidenyl-9,10-dihydro-anthracene - 10 - carboxylic acid chloride, is chosen preferentially from dialkyl derivatives such as β-methylamino-ethanol, β-diethylamino-ethanol, β-methylethylamino-ethanol, β-methyl-butylamino-ethanol, β-methylisopropylamino-ethanol and β-ethylbutylamino-ethanol. The reaction is conducted at room temperature and in the presence of an organic solvent such as petroleum ether.

If it is desired to form the acid addition salt of the novel compounds, this is done in the customary manner by neutralizing a solution of the compound in an organic solvent such as ether or acetone with a pharmaceutically acceptable organic or inorganic acid such as nitric acid, sulfuric acid, hydrochloric acid, phosphoric acid or oxalic acid, tartaric acid, citric acid, malic acid, maleic acid, formic acid, etc.

The following examples will serve for better comprehension of the invention. However, it is to be understood that they do not limit the invention in any manner.

EXAMPLE I

Preparation of the nitrate of the 9-isopropylidenyl-9,10-dihydro-anthracene-10-carboxylic acid ester with β-diethylamino-ethanol Step A: Preparation of 9-isopropylidenyl-9,10-dihydro-anthracene-10-carboxylic acid chloride.—3.4 gm. of 9-(2'-hydroxy-isopropyl)-9,10-dihydro-anthracene-10 - carboxylic acid were dissolved in 17 cc. of thionyl chloride. The reaction mixture was abandoned overnight. Thereafter, the excess thionyl chloride was removed under vacuum by heating it to an exterior temperature of 45° to 50° C. 10 cc. of benzene were added twice while the distillation was continued under vacuum until the crude acid chloride was dried. The crude acid chloride was triturated with 6 cc. of petroleum ether, then allowed to stand for 2 hours in an ice bath. The crystals were vacuum filtered, again triturated twice in iced petroleum ether and finally dried under vacuum. In this manner, 2.725 gm. of 9-isopropylidenyl-9,10-dihydro-anthracene-10-carboxylic acid chloride were obtained with a yield of 80% of the theory. The product had a melting point of 85° C. to 90° C.

This product is not known to be described in the literature.

Step B: Preparation of the nitrate of the 9-isopropylidenyl-9,10-dihydro-anthracene - 10 - carboxylic acid ester with β-diethylamino-ethanol.—The acid chloride, obtained in Step A, was dissolved in 20 cc. of petroleum ether and then filtered. The filtrate was poured into a solution of 10 cc. of β-diethylamino-ethanol in 10 cc. of petroleum ether. The reaction mixture was agitated overnight at room temperature. Thereafter, 30 cc. of a saturated solution of sodium bicarbonate was added and the reaction mixture was agitated for 10 minutes. The aqueous phase was decanted and extracted with petroleum ether. The combined organic phases were washed with water until the wash waters were neutral, then dried over sodium sulfate and evaporated to dryness under vacuum. Thus the 9-isopropylidenyl-9,10-dihydro-anthracene-10-carboxylic acid ester with β-diethylamino-ethanol was obtained.

This product is not believed to be described in the literature.

All of the product obtained was dissolved in 30 cc. of ether. To this solution, a solution of 0.975 cc. of nitric acid in 15 cc. of ether was added and the mixture was then iced for 1 hour. The resultant precipitate was vacuum filtered, then washed with ether and dried under vacuum. The crude nitrate had a melting point of 130° C. and was purified by recrystallization from butanol. In this manner, 2.79 gm. of the nitrate of the 9-isopropylidenyl-9,10-dihydro-anthracene-10-carboxylic acid ester with β-diethylamino-ethanol were recovered. The product occurred in the form of colorless crystals, soluble in water, dilute aqueous acids, alcohol, acetone and chloroform, and insoluble in ether and benzene. Its melting point was 137° C. (The yield was 67.5% of the theory.)

Analysis: $C_{24}H_{30}O_5N_2$; molecular weight=426.50. Calculated: C, 67.58%; H, 7.09%; N, 6.57%. Found: C, 67.7%; H, 7.1%; N, 6.5%.

Ultraviolet spectra (in ethanol)

$\lambda_{max.}$ at 206 m$\mu$ $E_{1\,cm.}^{1\%}$=1,110

Inflection to 234 m$\mu$ $E_{1\,cm.}^{1\%}$=312

$\lambda_{max.}$ at 259–260 m$\mu$ $E_{1\,cm.}^{1\%}$=301

This product is not believed to be described in the literature.

The starting material, namely, 9-(2'-hydroxy-isopropyl)-9,10-dihydro-anthracene-10-carboxylic acid, was obtained according to the process described by Rigaudy et al., Bull. Soc. Chim., France, 1954, page 1266.

EXAMPLE II

Preparation of the nitrate of the 9-isopropylidenyl- 9,10-dihydro-anthracene-10-carboxylic acid ester with β-dimethylamino-ethanol 1.69 gm. of acid chloride, obtained in Step A of Example I, were dissolved in 8 cc. of petroleum ether; then 5 cc. of β-dimethylamino-ethanol were slowly added thereto. The mixture was agitated for 68 hours at room temperature. Thereafter, 15 cc. of a saturated solution of sodium bicarbonate were added and the reaction mixture was extracted with 20 cc. of petroleum ether and 10 cc. of ethyl ether. The organic phase was separated and the aqueous phase was extracted with petroleum ether and ethyl ether. The combined organic phases were washed first with a saturated solution of sodium bicarbonate, then with water until the wash waters were neutral. Next, the organic phase was dried over sodium sulfate and evaporated to dryness. 2.01 gm. of the 9-isopropylidenyl-9,10-dihydro-anthracene-10-carboxylic acid ester with β-dimethylamino-ethanol were thus obtained.

This product is not believed to be described in the literature.

All of the product obtained above was dissolved in 20 cc. of ether, then filtered. The filter was washed with 15 cc. of ether. 0.5 cc. of nitric acid dissolved in 7.5 cc. of ether was added to the combined filtrate. The reaction mixture was iced for 1 hour and the precipitate was vacuum filtered, washed with ether and dried under vacuum. The crude nitrate was purified by recrystallization by heating and cooling in butanol. In this manner, 1.81 gm. of the nitrate of the 9-isopropylidenyl-9,10-dihydro-anthracene-10-carboxylic acid ester with β-dimethylamino-ethanol were recovered (that is a yield of 76% of theory). The product occurred in the form of colorless crystals, soluble in water, alcohol, acetone and chloroform, and insoluble in ether and benzene. The product had a melting point of 159° to 160° C.

Analysis—$C_{22}H_{26}O_5N_2$; molecular weight=398.55. Calculated: C, 66.31%; H, 6.58%; N, 7.03%. Found: C, 66.4%; H, 6.5%; N, 6.8%.

Ultraviolet spectra (in ethanol)

Inflection toward 234–235 m$\mu$ $E_{1\,cm.}^{1\%}$=336
$\lambda_{max.}$ at 260–261 m$\mu$ $E_{1\,cm.}^{1\%}$=331

This product is not believed to be described in the literature.

EXAMPLE III

Preparation of the oxalate of the 9-isopropylidenyl-9,10-dihydro-anthracene-10-carboxylic acid ester with β-dimethylamino-ethanol 1.62 gm. of the 9-isopropylidenyl-9,10-dihydro-anthracene-10-carboxylic acid ester with β-dimethylamino-ethanol, obtained in Example II, were dissolved in 6 cc. of acetone and filtered. The filtrate was poured under agitation into a solution of 500 mg. of anhydrous oxalic acid in 3 cc. of acetone. The acetonic solution was concentrated to a volume of about 5 cc., then it was allowed to cool. When the solution started to crystalize, it was iced for 1 hour. The crystals formed were vacuum filtered, washed with iced acetone and dried under vacuum. 1.88 gm. of the oxalate of the 9-isopropylidenyl-9,10-dihydro-anthracene-10-carboxylic acid ester with β-dimethylamino-ethanol were obtained. The product had a melting point of 163° C.

Analysis.—$C_{24}H_{27}O_6N$; molecular weight=425.46. Calculated: C, 67.75%; H, 6.40%; N, 3.29%. Found: C, 67.9%; H, 6.3%; N, 3.4%.

The product was soluble in water, dilute aqueous acids, alcohols, and acetone, and insoluble in ether, benzene and chloroform.

This product is not believed to be described in the literature.

In the same manner as described in the preceding examples, its is also possible to prepare other pharmaceutically acceptable organic or inorganic acid addition salts, such as those salts of tartaric, citric, malic, maleic, formic, sulfuric, hydrochloric or phosphoric acids, of the novel 9 - isopropylidenyl - 9,10 - dihydro-anthracene-10-carboxylic acid ested with β-di-lower-dialkylamino-ethanols of the general Formula I.

As it was indicated in the preceding, the novel products, object of the invention, are endowed with interesting pharmacological properties. In particular, they possess an important spasmolytical action.

They can be utilized in warm-blooded animals for the treatment of bronchial spasms, arterial or visceral spasms and for the treatment of circulatory ailments in general.

These products may be utilized orally, transcutaneously or rectally. They can be prepared in the form of injectable solutions or suspensions, put up in ampulses or in multiple-dose flacons, in the form of preparations for aerosols, in tablets, in coated tablets, in drops and in suppositories.

The useful dosology is controlled between about 70 γ to 300 γ/kilogram of body weight per day in warm-blooded animals and preferably between 5 and 20 milligrams per day in the adult, as a function of the method of administration.

The usual pharmaceutical forms such as injectable solutions or suspensions, preparations for aerosols, tablets, coated tablets, drops and suppositories are prepared according to the usual processes.

EXAMPLE IV

Pharmacological study of the new products, the objects of the invention

Spasmolytic action.—The spasmolytic action of the nitrate of the 9-isopropylidenyl19,10-dihydro-anthracene-10-carboxylic acid ester with β-diethylamino-ethanol was studied with respect to three principal contracting agents: barium chloride, acetylcholine and histamine.

The spasmolytic action was determined on the isolated intestine of the guinea pig in a vessel containing 10 cc. of Tyrode liquid maintained at a temperature of 37° C. and constantly oxygenated. An investigation was conducted to determine at which concentration the product effected the relaxation of the organ subjected to the spasmodic action of the three contracting agents employed. Furthermore, it was determined at which degree of concentration the product exerted an inhibitory effect with reference to these three agents.

The solution of the product studied was added to the bath at a constant volume, whatever its concentration was.

The concentration of the product, at which it exerts a spasmolytic activity, either in preventive or in curative capacity is about 0.5 to 1 μg./cc. Moreover, the product possesses a characteristic relaxing action at a concentration of 1 μg./cc.

The nitrate of the 9-isopropylidenyl-9,10-dihydroanthracene-10-carboxylic acid ester with β-dimethylamino-ethanol was studied under the same experimental conditions. It proved to be active, with reference to the three contracturing agents at a concentration of 5 to 10 μg./cc.

Determination of the toxicity.—The nitrate of the 9-isopropylidenyl - 9,10 - dihydro-anthracene-10-carboxylic acid ester with β-diethylamino-ethanol was utilized in solution in aqueous hydrochloric acid. It was administered in the form of intraperitoneal injections to groups of 5 mice per group of the Rockland strain, weighing between 18 and 22 gm., at doses of 50, 100 and 200 mg./kg. All of the animals were kept under observation for a week after treatment.

At non-fatal doses of 50 and 100 mg./kg., a condition of hyperexcitability (at doses of 50 mg./kg.) and a pre-conclusive condition (at doses of 100 mg./kg.) was noted.

At the dose of 200 mg./kg. all of the mice died after having displayed convulsions and respiratory shock.

The preceding specific embodiments are illustrative of the invention. It is to be understood, however, that other expedients known to those skilled in the art can be employed without departing from the spirit of the invention.

I claim:
1. A 9 - isopropylidenyl - 9,10-dihydro-anthracene-10-carboxylic acid ester selected from the group consisting of a compound of the formula wherein $R_1$ and $R_2$ represent a lower alkyl, and its pharmaceutically acceptable organic and inorganic acid addition salts.

2. The compound of claim 1 wherein $R_1$ and $R_2$ are ethyl.

3. The compound of claim 1 wherein $R_1$ and $R_2$ are methyl.

4. The compound of claim 2 wherein said pharmaceutically acceptable acid addition salt is the nitrate.

5. The compound of claim 3 wherein said pharmaceutically acceptable acid addition salt is the nitrate.

6. The compound of claim 3 wherein said pharmaceutically acceptable acid addition salt is the oxalate.

References Cited

UNITED STATES PATENTS 2,788,365   4/1957   Cusic _____ 260—469

OTHER REFERENCES

Kimura et al., Chem. Abstracts 1953, vol. 47, p. 6359b.
Wagner & Zook, Synthetic Org. Chem., p. 546.

LORRAINE A. WEINBERGER, *Primary Examiner.*

E. GLEIMAN, *Assistant Examiner.*

U.S. Cl. X.R.

260—520, 544, 999